United States Patent
Hashimoto et al.

(10) Patent No.: US 11,829,153 B2
(45) Date of Patent: *Nov. 28, 2023

(54) APPARATUS, METHOD, AND COMPUTER PROGRAM FOR IDENTIFYING STATE OF OBJECT, AND CONTROLLER

(71) Applicant: TOYOTA JIDOSHA KABUSHIKI KAISHA, Toyota (JP)

(72) Inventors: Daisuke Hashimoto, Chofu (JP); Ryusuke Kuroda, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

This patent is subject to a terminal disclaimer.

(21) Appl. No.: 17/218,348

(22) Filed: Mar. 31, 2021

(65) Prior Publication Data
US 2021/0312199 A1    Oct. 7, 2021

(30) Foreign Application Priority Data
Apr. 6, 2020    (JP) .................. 2020-068674

(51) Int. Cl.
*G06T 7/70*    (2017.01)
*G05D 1/02*    (2020.01)
(Continued)

(52) U.S. Cl.
CPC .......... *G05D 1/0246* (2013.01); *G06F 18/24* (2023.01); *G06T 7/70* (2017.01); *G06V 10/25* (2022.01);
(Continued)

(58) Field of Classification Search
CPC ...... G06V 20/584; G06V 10/44; G06V 10/22; G06T 7/70; G06T 2207/30241; G06T 2207/30252; G05D 1/0246
See application file for complete search history.

(56) References Cited

U.S. PATENT DOCUMENTS

2010/0036578 A1    2/2010  Taguchi et al.
2014/0279707 A1    9/2014  Joshua et al.
(Continued)

FOREIGN PATENT DOCUMENTS

DE    112007001501 B4    1/2021
JP    H06-255399 A    9/1994
(Continued)

OTHER PUBLICATIONS

Cho, Junguk, et al. "Parallelized architecture of multiple classifiers for face detection." IEEE. (Year: 2009).*
(Continued)

*Primary Examiner* — Shaghayegh Azima
(74) *Attorney, Agent, or Firm* — Dickinson Wright, PLLC

(57) ABSTRACT

An apparatus for identifying the state of an object includes a processor configured to input, every time obtaining an image from a camera, the image into a first classifier to detect, for each of one or more predetermined objects represented in the image, an object region including the object; determine a predicted object region in a subsequent image to be obtained from the camera for an object whose position in the subsequent image is predictable; and input characteristics into a second classifier to identify the state of an object involving time-varying changes in outward appearance. When the object has a predicted object region, the characteristics are obtained from pixel values of the predicted object region in the subsequent image. On the other hand, when the object does not have a predicted object region, the characteristics are obtained from pixel values of the object region detected from the subsequent image.

6 Claims, 8 Drawing Sheets

(51) Int. Cl.
*G06V 20/58* (2022.01)
*G06F 18/24* (2023.01)
*G06V 10/25* (2022.01)
*G06V 30/19* (2022.01)

(52) U.S. Cl.
CPC .......... *G06V 20/58* (2022.01); *G06V 20/584* (2022.01); *G06V 30/19013* (2022.01); *G06T 2207/30241* (2013.01); *G06T 2207/30252* (2013.01)

(56) References Cited

U.S. PATENT DOCUMENTS

| | | |
|---|---|---|
| 2017/0174261 A1 | 6/2017 | Micks et al. |
| 2017/0262750 A1 | 9/2017 | Kozuka et al. |
| 2017/0267178 A1 | 9/2017 | Shiga et al. |
| 2018/0061105 A1* | 3/2018 | Ito .................. G06T 7/292 |
| 2018/0339710 A1 | 11/2018 | Hashimoto |
| 2019/0034762 A1 | 1/2019 | Hashimoto |
| 2019/0066313 A1 | 2/2019 | Kim et al. |
| 2019/0092318 A1* | 3/2019 | Mei .................. B60W 30/09 |
| 2019/0113927 A1 | 4/2019 | Englard et al. |
| 2019/0162837 A1 | 5/2019 | Komori |
| 2019/0163991 A1 | 5/2019 | Tian et al. |
| 2019/0171912 A1* | 6/2019 | Vallespi-Gonzalez ............... G06V 10/764 |
| 2019/0179006 A1 | 6/2019 | Baba et al. |
| 2019/0197729 A1* | 6/2019 | Liang .................. G06T 7/75 |
| 2019/0333381 A1* | 10/2019 | Shalev-Shwartz ... G08G 1/0145 |
| 2019/0347806 A1* | 11/2019 | Vajapey .................. G06T 7/20 |
| 2019/0354835 A1* | 11/2019 | Mac .................. G06N 3/08 |
| 2019/0367026 A1 | 12/2019 | Hattori et al. |
| 2019/0383626 A1 | 12/2019 | Fowe et al. |
| 2020/0097739 A1 | 3/2020 | Hashimoto et al. |
| 2020/0097756 A1 | 3/2020 | Hashimoto et al. |
| 2020/0111031 A1* | 4/2020 | Wakim .................. G06Q 10/06 |
| 2020/0160126 A1* | 5/2020 | Malach .................. G06V 10/82 |
| 2020/0160704 A1 | 5/2020 | Choi et al. |
| 2020/0301429 A1* | 9/2020 | Matsunaga .......... G05D 1/0223 |
| 2020/0346644 A1 | 11/2020 | Schmeichel |
| 2020/0353932 A1* | 11/2020 | Wang .................. G08G 1/04 |
| 2020/0358863 A1* | 11/2020 | Ichikawa .................. G06T 7/292 |
| 2021/0042542 A1* | 2/2021 | Littman .................. G06T 7/97 |
| 2021/0103746 A1* | 4/2021 | Chen .................. G06N 3/04 |
| 2021/0171025 A1* | 6/2021 | Ishikawa .................. G06N 3/08 |
| 2021/0174197 A1* | 6/2021 | Georgis .................. G06N 20/20 |
| 2021/0295058 A1 | 9/2021 | Hashimoto |
| 2021/0295530 A1* | 9/2021 | Janjic .................. G06T 7/20 |
| 2021/0309214 A1 | 10/2021 | Hashimoto et al. |
| 2022/0051413 A1* | 2/2022 | Itsumi .................. G06T 7/246 |
| 2022/0114807 A1* | 4/2022 | Iancu .................. G06V 20/58 |
| 2022/0301320 A1* | 9/2022 | Hashimoto .......... G06V 10/765 |

FOREIGN PATENT DOCUMENTS

| | | |
|---|---|---|
| JP | H06-325180 A | 11/1994 |
| JP | 2004-173195 A | 6/2004 |
| JP | 2008-123197 A | 5/2008 |
| JP | 2008-257350 A1 | 10/2008 |
| JP | 2010-006271 A | 1/2010 |
| JP | 2017-033270 A1 | 2/2017 |
| JP | 2017162438 A | 9/2017 |
| JP | 2018-026096 A | 2/2018 |
| JP | 2018-026108 A | 2/2018 |
| JP | 2018-101317 A | 6/2018 |
| JP | 2018-144695 A1 | 9/2018 |
| JP | 2019070934 A | 5/2019 |
| JP | 2019-096132 A | 6/2019 |
| JP | 2019-102049 A | 6/2019 |
| JP | 2019109691 A | 7/2019 |
| JP | 2019-151309 A | 9/2019 |
| WO | 2008004963 A1 | 10/2008 |

OTHER PUBLICATIONS

Alex Kendall et al., "Multi-Task Learning Using Uncertainty to Weigh Losses for Scene Geometry and Semantics", CVPR2018, arXiv:1705.071 15v3 [cs.CV], pp. 1-14 (Apr. 24, 2018).

Anna Petrovskaya et al., "Model Based Vehicle Tracking for Autonomous Driving in Urban Environments", Robotics: Science and Systems 2008, 2008, pp. 1-8.

Han-Kai Hsu et al., "Learning to Tell Brake and Turn Signals in Videos Using CNN-LSTM Structure", 2017 IEEE 20th International Conference on Intelligent Transportation Systems (ITSC), pp. 1-6.

Shaoqing Ren et al., "Faster R-CNN: Towards Real-Time Object Detection with Region Proposal Networks", NIPS, 2015, arXiv:1506.01497V3 [cs.CV], pp. 1-14 (Jan. 6, 2016).

Wei Liu et al., SSD: Single Shot MultiBox Detector, ECCV 2016, arXiv:1512.02325v5 [cs.CV], pp. 1-17 (Dec. 29, 2016).

Young-Chul Yoon et al., "Online Multiple Pedestrians Tracking using Deep Temporal Appearance Matching Association", arXiv:1907.00831v4 [cs.CV], pp. 1-28 (Oct. 9, 2020).

Office Action(s) relating to U.S. Appl. No. 17/218,280 (dated Nov. 18, 2022).

Daisuke Hashimoto, U.S. Appl. No. 17/218,280, Notice of Allowance dated Feb. 16, 2023.

Daisuke Hashimoto, U.S. Appl. No. 17/208,466, Notice of Allowance dated Jul. 11, 2023.

* cited by examiner

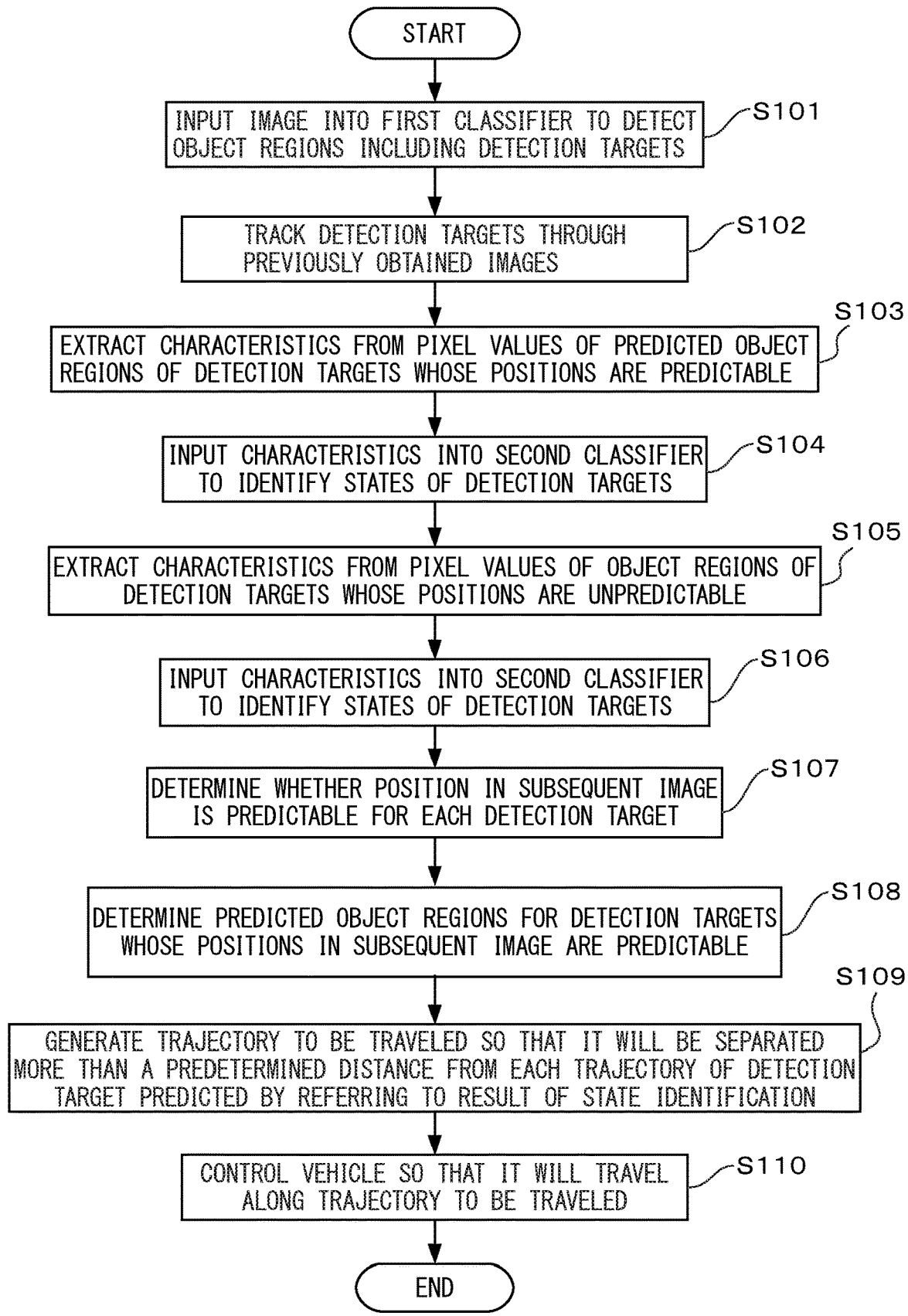

APPARATUS, METHOD, AND COMPUTER PROGRAM FOR IDENTIFYING STATE OF OBJECT, AND CONTROLLER

FIELD

The present invention relates to an apparatus, a method, and a computer program for identifying the state of an object represented in an image, as well as a controller including such an apparatus to control the travel of a vehicle.

BACKGROUND

A technique has been researched for controlling a vehicle to automatically drive the vehicle. Automatically driving a vehicle requires predicting the motion of an object near the vehicle and determining a trajectory to be traveled of the vehicle so as not to collide with the object. To this end, techniques have been proposed to predict the motion of an object near a vehicle (e.g., see Japanese Unexamined Patent Publication No. 2019-109691).

For example, a device for predicting the motion of a moving object disclosed in Japanese Unexamined Patent Publication No. 2019-109691 outputs a first predicted motion of a moving object recognizable from a host vehicle, based on the result of prediction of the motion of the moving object and the result of recognition thereof after a prediction time, and outputs a second predicted motion of a moving object recognizable from the vehicle, based on the motion of the vehicle. The device learns the first predicted motion so as to minimize the error between the result of prediction and that of recognition, and learns a possible second predicted motion of a moving object near the vehicle so that the vehicle will not be driven unsafely. The device also includes a first neural network that outputs the first predicted motion, using supervised learning, and a second neural network that outputs the second predicted motion, using reinforcement learning.

SUMMARY

When a process of predicting the motion of an object is executed using a neural network as in the above-described techniques, the amount of computation may be enormous. This may result in an excessive demand for the hardware that executes such a process, or may prevent such a process from finishing within a desired time.

It is an object of the present invention to provide an apparatus for identifying the state of an object while leveling the load of processing in terms of time.

According to an embodiment, an apparatus for identifying the state of an object is provided. The apparatus includes a processor configured to: input, every time obtaining an image from a camera, the image into a first classifier to detect, for each of at least one predetermined object represented in the image, an object region including the object in the image; determine, for each of the at least one predetermined object, whether the position of the object is predictable in a subsequent image to be obtained from the camera subsequent to the image obtained therefrom; determine, for each object whose position is predictable, a predicted object region including a predicted position of the object in the subsequent image. The processor is further configured to input, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image. On the other hand, the processor inputs, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image.

In the apparatus, detection of the object region by the first classifier and identification of the state of each of the at least one predetermined object by the second classifier are preferably executed using different operating circuits included in the processor.

In this case, identification of the state of the at least one predetermined object that has the predicted object region in the subsequent image by the second classifier and detection of the object region from the subsequent image by the first classifier are preferably executed in parallel.

Regarding the at least one predetermined object whose object region in the image has at least one edge in contact with one of the edges of the image, the processor preferably determines that the position of the object in the subsequent image is unpredictable, and does not determine the predicted object region in the subsequent image.

Alternatively, the camera is preferably mounted on a vehicle; and for each of the at least one predetermined object, the processor determines whether the object is traveling on a lane adjoining a travel lane of the vehicle, determines a distance from the vehicle; regarding the at least one predetermined object that is traveling on the adjoining lane and is a predetermined distance or less apart from the vehicle, determines that the position of the object in the subsequent image is unpredictable, and does not determine the predicted object region in the subsequent image.

According to another embodiment, a controller for controlling travel of a vehicle is provided. The controller includes a processor configured to: input, every time obtaining an image from a camera mounted on the vehicle, the image into a first classifier to detect, for each of at least one predetermined object located near the vehicle and represented in the image, an object region including the object in the image; determine, for each of the at least one predetermined object, whether the position of the object is predictable in a subsequent image to be obtained from the camera subsequent to the image obtained therefrom, and determine, for each object whose position is predictable, a predicted object region including a predicted position of the object in the subsequent image. The processor is further configured to input, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image. On the other hand, the processor inputs, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image. The processor is further configured to predict, for each of the at least one predetermined object, a trajectory on which the object will move, based on the state of the object, determine a trajectory to be traveled of the vehicle, based on the predicted trajectory, so that the vehicle will be separated from any of the at least one predetermined object more than a predetermined distance; and control the vehicle so that the vehicle will travel along the trajectory to be traveled.

According to still another embodiment, a method for identifying the state of an object is provided. The method includes: inputting, every time obtaining an image from a camera, the image into a first classifier to detect, for each of at least one predetermined object represented in the image, an object region including the object in the image; determining, for each of the at least one predetermined object, whether the position of the object is predictable in a subsequent image to be obtained from the camera subsequent to the image obtained therefrom; determining, for each object whose position is predictable, a predicted object region including a predicted position of the object in the subsequent image. The method further includes inputting, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image; and inputting, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image.

According to yet another embodiment, a non-transitory recording medium having recorded thereon a computer program for identifying the state of an object is provided. The computer program includes instructions for causing a computer to execute a process including: inputting, every time obtaining an image from a camera, the image into a first classifier to detect, for each of at least one predetermined object represented in the image, an object region including the object in the image; determining, for each of the at least one predetermined object, whether the position of the object is predictable in a subsequent image to be obtained from the camera subsequent to the image obtained therefrom; determining, for each object whose position is predictable, a predicted object region including a predicted position of the object in the subsequent image. The process further includes: inputting, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image; and inputting, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image.

The apparatus according to the present invention has an advantageous effect of being able to level the load of processing in terms of time.

BRIEF DESCRIPTION OF DRAWINGS

FIG. 8 is an operation flowchart of the vehicle control process including the object-state identifying process.

DESCRIPTION OF EMBODIMENTS

Figure 1:
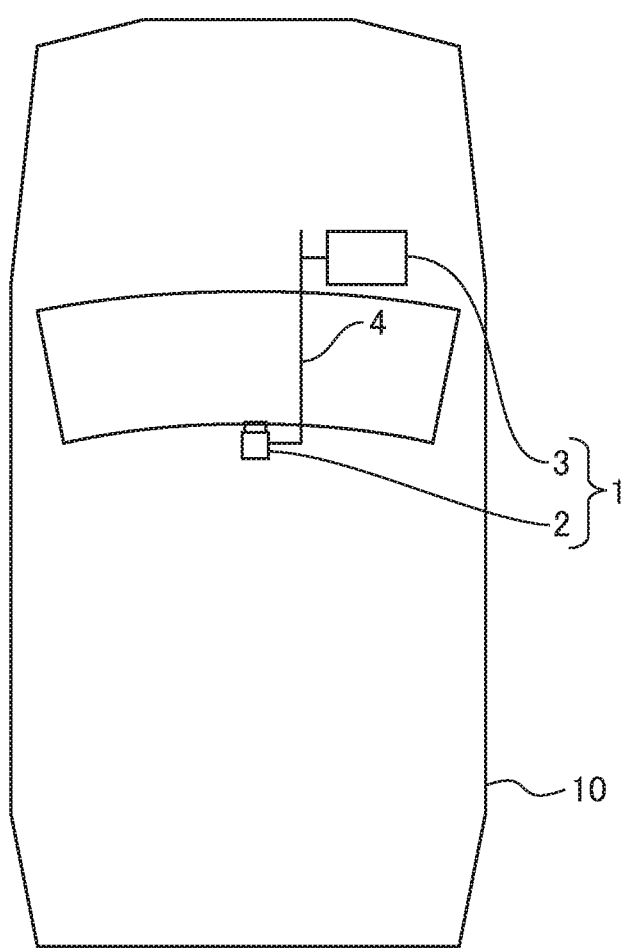
FIG. 1 schematically illustrates the configuration of a vehicle control system including an apparatus for identifying the state of an object.

Hereinafter, an apparatus for identifying the state of an object, a method therefor performed by the apparatus, and a computer program therefor will be described with reference to the accompanying drawings. The apparatus is mounted on, for example, a vehicle, and identifies the state, which involves time-varying changes in outward appearance, of a target object for detection (hereafter, a "detection target"), such as another vehicle near the host vehicle. To this end, every time an image is obtained by a camera mounted on the host vehicle, the apparatus inputs the image into a first classifier that has been trained to detect a detection target, thereby detecting a region including the detection target (hereafter, an "object region") in the image. The apparatus tracks the detected target to associate the object regions representing the same target in the images with each other. The apparatus determines whether the position of a tracked detection target is predictable in an image to be obtained next, based on, for example, the position of the object region including the detection target, and determines a predicted object region including a predicted position of the detection target when the position of the detection target is predictable. When it is determined that the position of the detection target is predictable, the apparatus inputs, in response to obtaining the next image, characteristics into a second classifier, which has a recursive structure or performs a convolution operation in the temporal direction, thereby identifying the state of the detection target. These characteristics are obtained from pixel values of the predicted object region and inputted before the object region is detected from the next image by the first classifier. In contrast, when it is determined that the position of the detection target is unpredictable, the apparatus inputs, in response to obtaining the next image, characteristics obtained from pixel values of the object region detected from the next image by the first classifier into the second classifier, thereby identifying the state of the detection target. Thus, even when tracking multiple detection targets simultaneously, the apparatus can stagger the timings of processes executed by the second classifier for the respective detection targets. This enable the apparatus to level the load of processing in terms of time. In the case that the apparatus includes multiple operating circuits, waiting times of one or more of these operating circuits that execute processing of the second classifier are reduced, resulting in an improvement in the throughput of the whole object-state identifying process.

For example, assume that the detection target is a vehicle. A vehicle blinks a turn signal when turning left or right. A vehicle also turns on brake lights when slowing down, and blinks hazard lights during a stop, for example. Turning-on or blinking of a signal light of a vehicle, such as a turn signal or a brake light, involves time-varying changes in outward appearance of the vehicle, and represents a state related to the motion of the vehicle. However, since an individual image representing a turn signal, a brake light, or a hazard light does not indicate time-varying changes caused by blinking of such a signal light, it is difficult to accurately identify whether a turn signal or a hazard light is blinking and whether a brake light is on or off, based on an individual image representing such a signal light. The apparatus can accurately identify whether a turn signal or a hazard light is blinking and whether a brake light is on or off, by inputting characteristics obtained from pixel values of object regions in time series images into a second classifier having a recursive structure, as described above.

The following describes an example in which the apparatus for identifying the state of an object is applied to a vehicle control system. In this example, the apparatus performs an object-state identifying process on time series images obtained by a camera mounted on a host vehicle, thereby detecting another vehicle near the host vehicle as a detection target. The apparatus then identifies the state of the detected vehicle involving changes in outward appearance, i.e., whether its right or left turn signal or its hazard lights are blinking and whether its brake lights are on or off.

Figure 2:
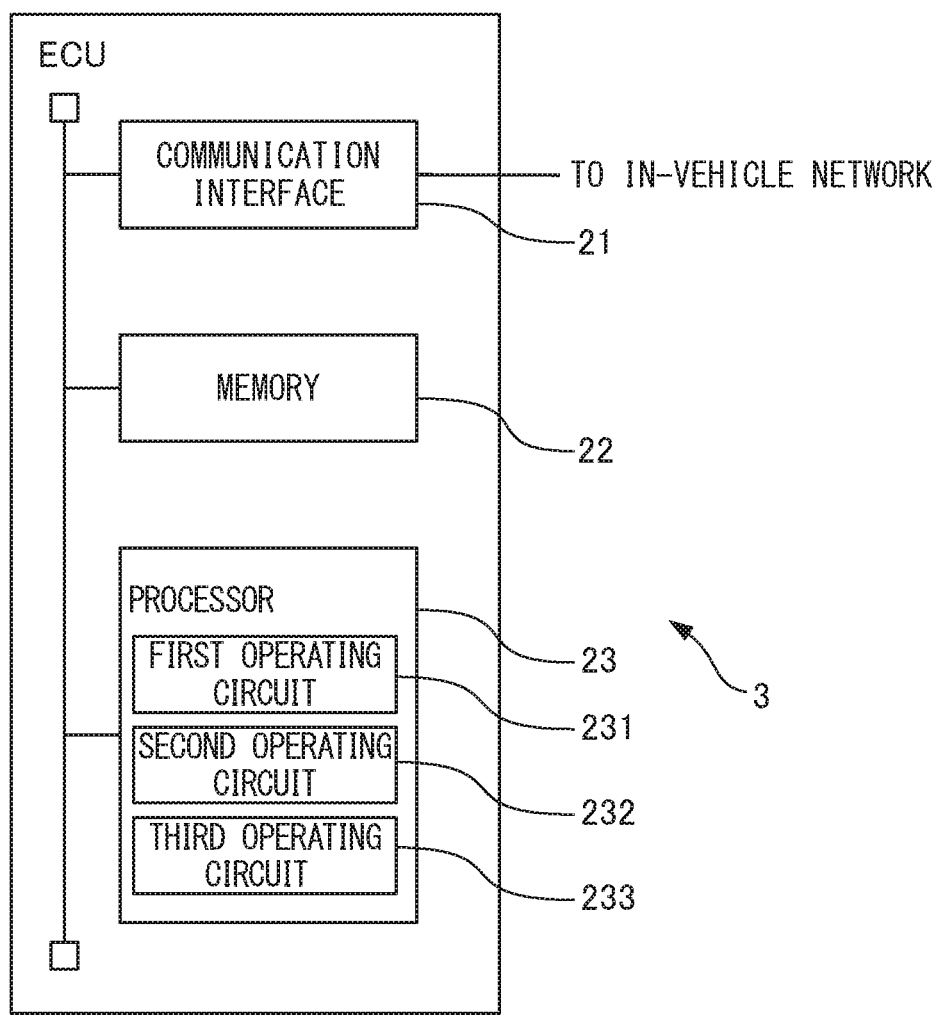
FIG. 2 illustrates the hardware configuration of an electronic control unit, which is an embodiment of the apparatus.

FIG. 1 schematically illustrates the configuration of a vehicle control system including the apparatus for identifying the state of an object. FIG. 2 illustrates the hardware configuration of an electronic control unit, which is an embodiment of the apparatus. In the present embodiment, the vehicle control system 1, which is mounted on a host vehicle 10 and controls the vehicle 10, includes a camera 2 for capturing surroundings of the vehicle 10, and an electronic control unit (ECU) 3, which is an example of the apparatus. The camera 2 is connected to the ECU 3 so that they can communicate via an in-vehicle network 4 conforming to a standard, such as a controller area network. The vehicle control system 1 may further include a storage device storing a map used for automated driving control of the vehicle 10. The vehicle control system 1 may further include a range sensor, such as LiDAR or radar; a receiver for determining the location of the vehicle 10 in conformity with a satellite positioning system, such as a GPS receiver; a wireless communication terminal for wireless communication with another device; and a navigation device for searching for a planned travel route of the vehicle 10.

The camera 2 is an example of an image capturing unit that is a sensor for detecting an object in a predetermined sensing range. The camera 2 includes a two-dimensional detector constructed from an array of optoelectronic transducers, such as CCD or C-MOS, having sensitivity to visible light and a focusing optical system focusing an image of a target region on the two-dimensional detector. The camera 2 is mounted, for example, in the interior of the vehicle 10 so as to be oriented to the front of the vehicle 10. The camera 2 captures a region in front of the vehicle 10 every predetermined capturing period (e.g., $\frac{1}{30}$ to $\frac{1}{10}$ seconds), and generates images in which this region is included. The images obtained by the camera 2 are preferably color images. The vehicle 10 may include multiple cameras taking pictures in different orientations or having different focal lengths.

Every time generating an image, the camera 2 outputs the generated image to the ECU 3 via the in-vehicle network 4.

The ECU 3 controls the vehicle 10. In the present embodiment, the ECU 3 controls the vehicle 10 so as to automatically drive the vehicle 10, depending on an object detected from time series images obtained by the camera 2. To this end, the ECU 3 includes a communication interface 21, a memory 22, and a processor 23.

The communication interface 21, which is an example of a communication unit, includes an interface circuit for connecting the ECU 3 to the in-vehicle network 4. In other words, the communication interface 21 is connected to the camera 2 via the in-vehicle network 4. Every time receiving an image from the camera 2, the communication interface 21 passes the received image to the processor 23.

The memory 22, which is an example of a storing unit, includes, for example, volatile and nonvolatile semiconductor memories. In the case that the processor 23 includes multiple operating units as will be described below, the memory 22 may include dedicated memory circuits for the respective operating units. The memory 22 stores various types of data and various parameters used in the object-state identifying process executed by the processor 23 of the ECU 3, e.g., images received from the camera 2, various parameters for specifying classifiers used in the object-state identifying process, and confidence-score thresholds for respective types of objects. The memory 22 also stores various types of data generated in the object-state identifying process, such as a detected-object list indicating information related to detected objects, for a certain period. The memory 22 may further store information used for travel control of the vehicle 10, such as map information.

The processor 23 is an example of a control unit. In the present embodiment, the processor 23 includes a first operating circuit 231, a second operating circuit 232, and a third operating circuit 233. The first operating circuit 231 includes, for example, one or more central processing units (CPUs) and a peripheral circuit thereof. The second operating circuit 232 includes one or more graphics processing units (GPUs). The third operating circuit 233 includes one or more arithmetic circuits, such as "neural network accelerators," tailored to a predetermined operation (e.g., a convolution operation) executed by a second classifier. The first, second, and third operating circuits 231, 232, and 233 can execute predetermined computations in cooperation with each other, for example, with a shared memory (not illustrated) that is accessible to them. The first operating circuit 231 is more versatile than the second operating circuit 232 and the third operating circuit 233, but operates slower than them. The second operating circuit 232 can perform fewer types of operation than the first operating circuit 231, but operates faster than it. The third operating circuit 233 can perform fewer types of operation than the second operating circuit 232, but operates faster than the first operating circuit 231 and the second operating circuit 232. According to a modified example, the third operating circuit 233 may include the same GPU as the second operating circuit 232.

Every time receiving an image from the camera 2 during travel of the vehicle 10, the processor 23 executes a vehicle control process including the object-state identifying process on the received image. The processor 23 controls the vehicle 10 so as to automatically drive the vehicle 10, depending on a detected object near the vehicle 10.

Figure 3:
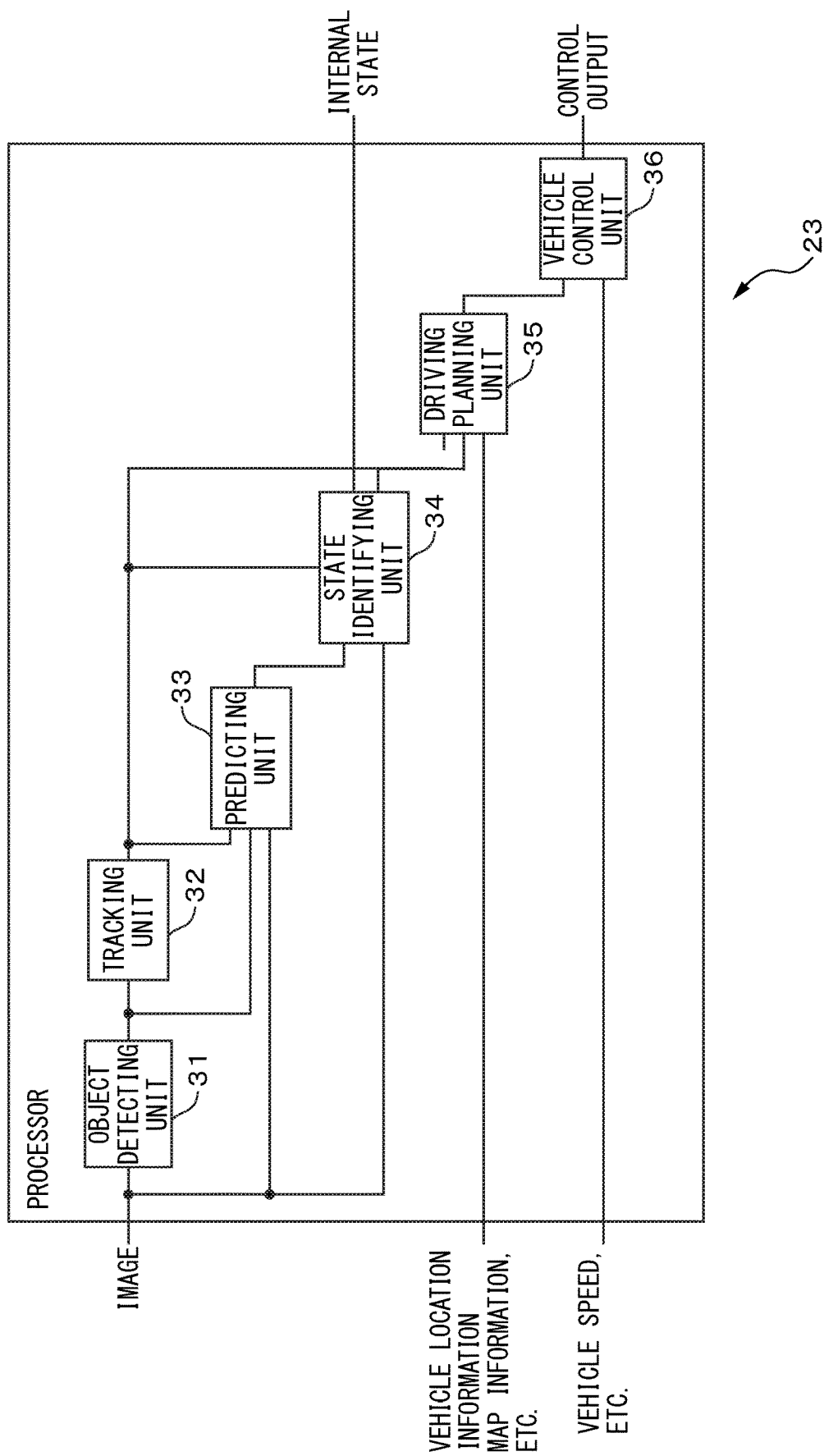
FIG. 3 is a functional block diagram of a processor of the electronic control unit, related to a vehicle control process including an object-state identifying process.

FIG. 3 is a functional block diagram of the processor 23 of the ECU 3, related to the vehicle control process including the object-state identifying process. The processor 23 includes an object detecting unit 31, a tracking unit 32, a predicting unit 33, a state identifying unit 34, a driving planning unit 35, and a vehicle control unit 36. These units included in the processor 23 are, for example, functional modules implemented by a computer program executed on the processor 23. Of these units included in the processor 23, the object detecting unit 31, the tracking unit 32, the predicting unit 33, and the state identifying unit 34 perform the object-state identifying process. In the case that the vehicle 10 includes multiple cameras, the processor 23 may perform the object-state identifying process for each camera, based on images obtained by the camera.

Every time receiving an image from the camera 2, the object detecting unit 31 inputs the latest received image into a first classifier for object detection to detect an object region including a detection target represented in the image and to identify the type of the detection target. Of the object detecting process, the object detecting unit 31 performs computations of the first classifier, for example, using the second operating circuit 232 and the other processing, for example, using the first operating circuit 231.

In the present embodiment, the object detecting unit 31 uses, as the first classifier, a "deep neural network" (hereafter simply a "DNN") that has been trained to detect an object region including a detection target represented in an image and to identify the type of the detection target. The DNN used by the object detecting unit 31 may be, for example, a DNN having a convolutional neural network (hereafter, "CNN") architecture, such as a Single Shot MultiBox Detector (SSD) or a Faster R-CNN.

Figure 4:
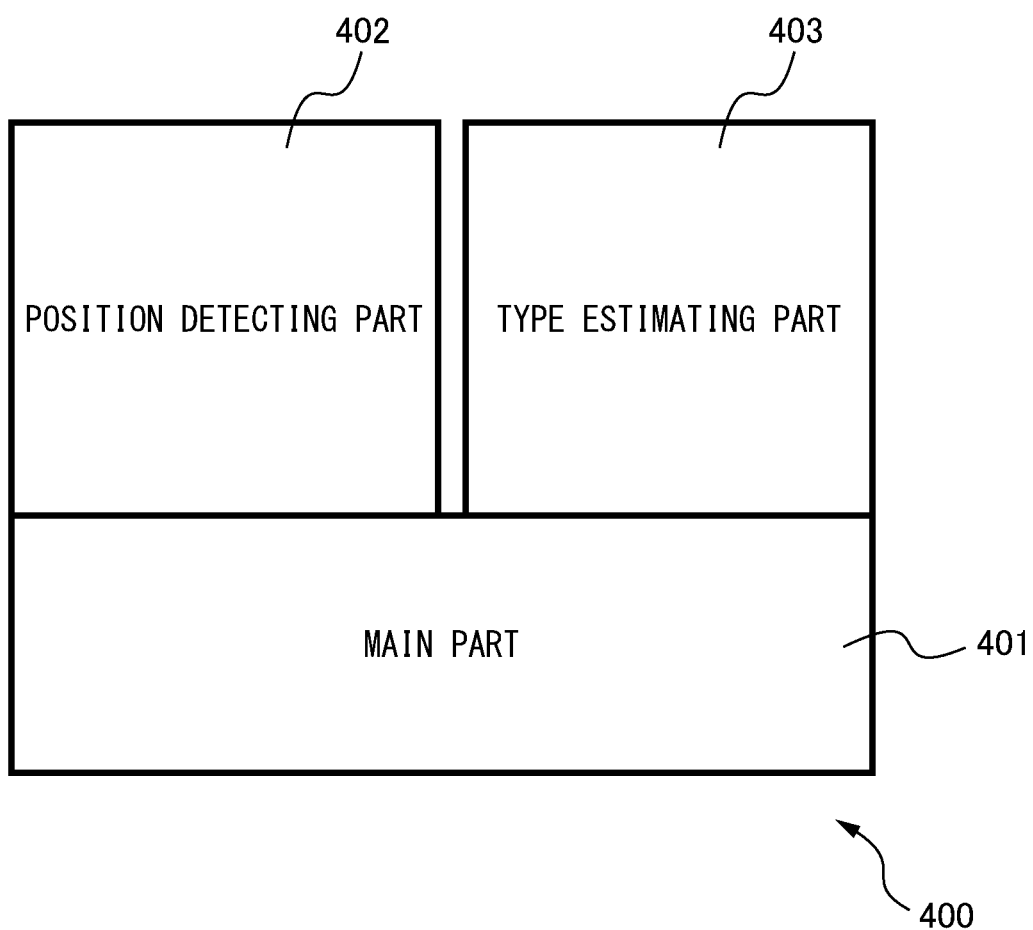
FIG. 4 illustrates an example of the configuration of a DNN used as the first classifier.

FIG. 4 illustrates an example of the configuration of a DNN used as the first classifier. The DNN 400 includes a main part 401, which is provided on the input of images, and a position detecting part 402 and a type estimating part 403, which are provided closer to the output than the main part 401. The position detecting part 402 outputs, as an object region, the circumscribed rectangle of a detection target represented in an image, depending on the output from the main part 401. The type estimating part 403 calculates confidence scores of respective types of detection targets represented in object regions detected by the position detecting part 402, depending on the output from the main part 401. The position detecting part 402 and the type estimating part 403 may be integrated.

The main part 401 may be, for example, a CNN including multiple layers connected in series from the input toward the output. These multiple layers include two or more convolution layers. The multiple layers of the main part 401 may further include a pooling layer every one or more convolution layers. The multiple layers of the main part 401 may further include one or more fully-connected layers. For example, the main part 401 may be configured similarly to a base layer of an SSD. Alternatively, the main part 401 may be configured in accordance with another CNN architecture, such as VGG-19, AlexNet, or Network-In-Network.

Upon input of an image, the main part 401 performs an operation on the image in each layer to output a feature map calculated from the image. The main part 401 may output multiple feature maps of different resolutions. For example, the main part 401 may output a feature map with the same resolution as the inputted image, and one or more feature maps with a resolution lower than the inputted image.

The feature maps outputted from the main part 401 are inputted into the position detecting part 402 and the type estimating part 403. The position detecting part 402 and the type estimating part 403 may be, for example, CNNs each including multiple layers connected in series from the input toward the output. In the position detecting part 402 and the type estimating part 403, the multiple layers of each CNN include two or more convolution layers. In the position detecting part 402 and the type estimating part 403, the multiple layers of each CNN may include a pooling layer every one or more convolution layers. The convolution layers and the pooling layers may be common to the CNNs of the position detecting part 402 and the type estimating part 403. Additionally, in the position detecting part 402 and the type estimating part 403, the multiple layers may include one or more fully-connected layers. In this case, the fully-connected layers are preferably provided closer to the output than the convolution layers. The outputs from the convolution layers may be directly inputted into the fully-connected layers. The output layer of the type estimating part 403 may be a softmax layer that calculates confidence scores of respective types of detection targets in accordance with a softmax function, or a sigmoid layer that calculates such confidence scores in accordance with a sigmoid function.

The position detecting part 402 and the type estimating part 403 are trained so as to output confidence scores of respective types of detection targets, for example, for each of regions located at various positions in an image and having various sizes and aspect ratios. Thus, upon input of an image, the classifier 400 outputs confidence scores of respective types of detection targets for each of regions located at various positions in the image and having various sizes and aspect ratios. The position detecting part 402 and the type estimating part 403 then detect a region for which the confidence score of a certain type of detection target is not less than a predetermined confidence-score threshold, as an object region representing a detection target of this type.

Images (training images) included in training data used for training of the classifier 400 are tagged with, for example, types of detection targets (e.g., ordinary passenger cars, buses, trucks, and motorcycles) and circumscribed rectangles of the detection targets, which are object regions representing the detection targets.

The classifier 400 is trained with a large number of training images like those described above in accordance with a training technique, such as backpropagation. The use of the classifier 400 trained in this way allows the processor 23 to accurately detect, from an image, a target object for detection.

The object detecting unit 31 may also detect an object that affects travel control of the vehicle 10, besides vehicles near the vehicle 10. Examples of such an object include a human, a signpost, a traffic light, a road marking such as a lane division line, and another object on a road. In this case, the first classifier is trained in advance to detect these objects. The object detecting unit 31 can also detect these objects by inputting an image into the first classifier.

The object detecting unit 31 may further perform a non-maximum suppression (NMS) process to select one of object regions that are assumed to represent the same object out of two or more overlapping object regions.

The object detecting unit 31 enters, in a detected-object list, the position and area of each object region in the image, and the type of the object included in the object region. The object detecting unit 31 stores the detected-object list in the memory 22.

The tracking unit 32 refers to the detected-object list to associate, for each object region detected from the latest image, the detection target represented in the object region with a detection target detected from a past image, thereby tracking the detection target represented in the object region. The tracking unit 32 performs the tracking process, for example, using the first operating circuit 231.

The tracking unit 32 applies, for example, a tracking process based on optical flow, such as the Lucas-Kanade method, to an object region of interest in the latest image and the object regions in the past images, thereby tracking the detection target represented in the object region. To this end, the tracking unit 32 applies, for example, a filter for extracting characteristic points, such as a SIFT or Harris operator, to the object region of interest, thereby extracting multiple characteristic points from this object region. Then, the tracking unit 32 may identify those points in the object regions in the past images which correspond to each of the characteristic points in accordance with the applied tracking technique, thereby calculating the optical flow. Alternatively, the tracking unit 32 may apply another tracking technique, which is applied for tracking a moving object detected from an image, to the object region of interest in the latest image and the object regions in the past images, thereby tracking the detection target represented in the object region.

The tracking unit 32 determines a detection target that is detected from the latest image and associated with none of detection targets represented in the past images as a new tracking target, assigns this detection target an identification number different from the identification numbers of the other tracked detection targets, and enters the assigned identification number in the detected-object list. The tracking unit 32 associates a detection target that is detected from the latest image and associated with a detection target represented in the past images, i.e., one of the tracked detection targets, with the same identification number as assigned to this tracked detection target.

When the number of tracked detection targets is greater than a predetermined number, the tracking unit 32 may select, out of the tracked detection targets, a predetermined number of detection targets as target objects for state identification. For example, since a detection target closer to the vehicle 10 affects driving control of the vehicle 10 more, the tracking unit 32 may select a predetermined number of tracked detection targets in ascending order of distance from the vehicle 10. For example, it is supposed that the larger the object region representing a detection target in an image, the shorter the distance from the vehicle 10 to this detection target. Thus, the tracking unit 32 may select, for example, a predetermined number of detection targets in descending order of size of object regions in the latest image. Alternatively, in the case that the vehicle control system 1 includes a range sensor (not illustrated), such as LiDAR or radar, the range sensor may measure the distance to each tracked detection target. In this case, for example, the distance in that direction from the range sensor which corresponds to the direction from the camera 2 to the location corresponding to the centroid of an object region representing a detection target in an image is measured as the distance from the vehicle 10 to this detection target. Then, the tracking unit 32 may select a predetermined number of detection targets in ascending order of estimated or measured distance from the vehicle 10. Alternatively, the tracking unit 32 may select a predetermined number of tracked detection targets lane by lane.

When the object detecting unit 31 detects detection targets from the latest image (hereafter, the "current image") obtained from the camera 2 and the tracking unit 32 performs the tracking process, the predicting unit 33 determines, for each tracked detection target, whether the position of the detection target is predictable in the image to be obtained next (hereafter, the "subsequent image"). For a detection target whose position in the subsequent image is predictable, the predicting unit 33 determines a predicted object region including a predicted position thereof. The predicting unit 33 performs the predicting process, for example, using the first operating circuit 231.

For example, when at least one edge of an object region is in contact with one of the edges of the current image, the predicting unit 33 determines that the position of the detection target included in this object region is unpredictable in the subsequent image. This is because the whole detection target is not represented in the current image and thus how the positional relationship between the vehicle 10 and the detection target will change between the times of acquisition of the current and subsequent images may not be correctly predicted.

Figure 5:
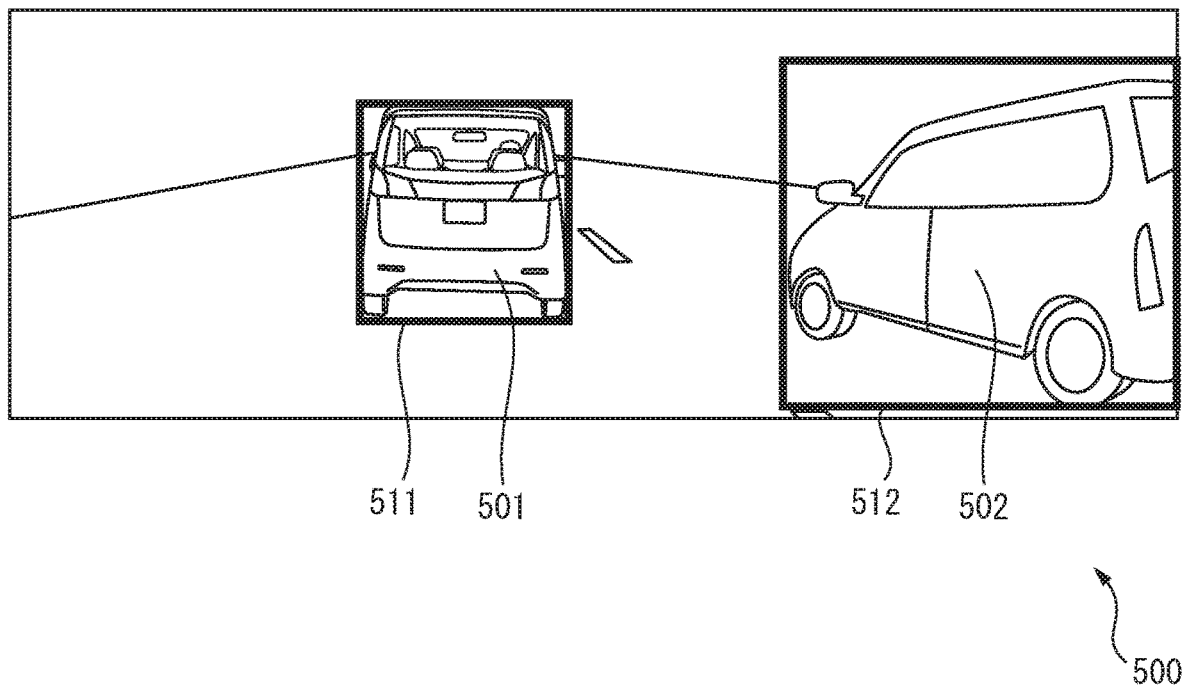
FIG. 5 illustrates an example of a detection target whose position in a subsequent image is predictable and a detection target whose position in a subsequent image is unpredictable.

FIG. 5 illustrates an example of a detection target whose position in the subsequent image is predictable and a detection target whose position in the subsequent image is unpredictable. In the image 500 illustrated in FIG. 5, the object region 511 including a vehicle 501 traveling on the same lane as the vehicle 10 is not in contact with any edge of the image 500. Hence, it is determined that the position of the vehicle 501 in the subsequent image is predictable. However, the object region 512 including a vehicle 502 traveling on a lane adjoining the travel lane of the vehicle 10 has a right edge in contact with the right edge of the image 500. Hence, it is determined that the position of the vehicle 502 in the subsequent image is unpredictable.

Alternatively, the predicting unit 33 determines that the position of a detection target of interest in the subsequent image is unpredictable, in the case that the current image satisfies the following conditions: the detection target is traveling on a lane adjoining the travel lane of the vehicle 10; and the distance between the detection target and the vehicle 10 is not more than a predetermined distance, or the size of the object region including the detection target is not less than a predetermined size. This is because the position of the detection target in the subsequent image may move significantly with respect to its position in the current image due to, for example, the detection target entering the travel lane of the vehicle 10, passing the vehicle 10, or being passed by the vehicle 10.

In the case that, for example, the object detecting unit 31 or a localizing processing unit (not illustrated) detects lane division lines from the current image, the predicting unit 33 may identify the travel lanes of the respective detection targets, based on the positional relationship between the lane division lines and the object regions. For example, the predicting unit 33 may determine that the detection target of interest is on the lane sandwiched between two lane division lines located on the respective sides of the bottom of the object region including the detection target. In this way, the predicting unit 33 can determine whether the detection target of interest is traveling on a lane adjoining the travel lane of the vehicle 10.

When the detection target of interest is traveling on the same road as the vehicle 10, the position of the bottom of the object region including the detection target in an image is assumed to correspond to the location of the detection target on the road surface. The positions of pixels in an image correspond one-to-one to the directions from the camera 2 to the positions corresponding to the respective pixels. Thus, the predicting unit 33 can determine the direction from the camera 2 to the position of the detection target of interest on the road surface, based on the position of the bottom of the object region including the detection target in an image. Thus, the predicting unit 33 can estimate the distance from the vehicle 10 to the detection target, based on the mounted position (including the height from the road surface) of the camera 2 stored in the memory 22 and the determined direction from the camera 2 to the position of the detection target on the road surface.

Alternatively, the predicting unit 33 may estimate the distance from the vehicle 10 to the detection target of interest, based on the ratio of the size (e.g., width) of the object region representing the detection target to a reference size, which is the size of a reference object of the same type as the detection target measured under the assumption that the reference object is a predetermined distance apart from the vehicle 10. Alternatively, in the case that the vehicle control system 1 includes a range sensor (not illustrated), such as LiDAR or radar, the range sensor may measure the distance to the detection target of interest. In this case, for example, the distance in that direction from the range sensor which corresponds to the direction from the camera 2 to the location corresponding to the centroid of the object region representing the detection target of interest in an image is measured as the distance from the vehicle 10 to the detection target. The predicting unit 33 may compare the distance from the vehicle 10 to the detection target of interest, which is estimated as described above, with the predetermined distance to determine whether the position of the detection target in the subsequent image is predictable.

Alternatively, the predicting unit 33 may determine whether the position of the detection target of interest in the subsequent image is predictable, based on the motion of another leading detection target ahead of the detection target of interest. For example, the predicting unit 33 may determine that the position of the detection target of interest in the subsequent image is unpredictable, in the case that the leading detection target, which had been traveling on the same lane as the detection target of interest at a first time a predetermined time ago, changed lanes after the first time. This is because the detection target of interest traveling behind may also change lanes due to, for example, some obstruction, such as a parked vehicle, ahead of the leading detection target. The predicting unit 33 can determine whether each detection target has changed lanes, by identifying the travel lane in every image in the same manner as described above.

The predicting unit 33 determines a predicted object region including a predicted position in the subsequent image, regarding a detection target for which it is determined that the position in the subsequent image is predictable. In general, the positional relationship between the vehicle 10 and that detection target near the vehicle whose position in the subsequent image is predictable does not rapidly change. Thus, the predicting unit 33 can suppose that the position of the detection target in the current image is the same as the predicted position of the detection target in the subsequent image. Thus, the predicting unit 33 defines the predicted object region as a region in the subsequent image that is the same as the object region including the detection target in the current image.

Alternatively, the predicting unit 33 may determine, as the predicted position of a detection target, a predicted position of the centroid of the object region in the subsequent image obtained by approximating a chronological sequence of the centroid positions of the object regions in respective sequential images obtained in a preceding predetermined period with a straight line or a polynomial. Similarly, the predicting unit 33 may determine, as the size of the predicted object region, a predicted size of the object region in the subsequent image obtained by approximating a chronological sequence of the sizes (including widths and heights) of the object regions in respective sequential images obtained in a preceding predetermined period with a straight line or a polynomial. The predicting unit 33 defines the predicted object region as a region of the predicted size having the centroid at the predicted position of the detection target in the subsequent image.

Regarding a detection target for which it is determined that the position in the subsequent image is unpredictable, the predicting unit 33 updates the value of a flag in the detected-object list indicating whether the position in the subsequent image is predictable so as to indicate that the position in the subsequent image is unpredictable. Additionally, regarding a detection target for which it is determined that the position in the subsequent image is predictable, the predicting unit 33 enters information indicating the position and area of the predicted object region in the subsequent image (e.g., the coordinates of the upper left end and the lower right end of the predicted object region) in the detected-object list.

According to a modified example, the predicting unit 33 may perform the above-described process on the current image before or in parallel with the object detecting process by the object detecting unit 31, instead of performing it after the object detecting process. In this case, the predicting unit 33 may perform a process similar to that of the embodiment on the position of a detection target or the object region including the detection target in the previous image, instead of the position of the detection target or the object region including the detection target in the current image, thereby determining whether the position in the current image is predictable. According to this modified example, the predicting unit 33 may compare the previous image with the current image to determine whether the position of a detection target in the current image is predictable. For example, the predicting unit 33 may determine that the position of a detection target in the current image is unpredictable, when the absolute value of the difference between a statistically representative value (e.g., an average, a median, or a mode) of luminance values of pixels in the previous image and a statistically representative value of luminance values of pixels in the current image is not less than a predetermined threshold of luminance. In this way, the predicting unit 33 can determine that the position of a detection target in the current image is unpredictable, when the brightness of surroundings of the vehicle 10 rapidly changes, e.g., before and after the vehicle 10 enters or exits from a tunnel. As a result, information on the object region actually detected from the current image by the object detecting unit 31 will be used for identifying the state of a detection target. When the brightness of surroundings of the vehicle 10 rapidly changes, that position of a detection target after the change, i.e., in the current image which is predicted from the position thereof before the change, i.e., in the previous image may be more accurate than the position of the detection target actually detected from the current image by the object detecting unit 31. Thus, in contrast to the above-described example, the predicting unit 33 may determine that the position of a detection target in the current image is predictable, regardless of the positions of the detection target and the object region including the detection target in the previous image, when the absolute value of the difference between a statistically representative value of luminance values of pixels in the previous image and a statistically representative value of luminance values of pixels in the current image is not less than the predetermined threshold.

Regarding a detection target for which it is determined that the position in the subsequent image is predictable, based on the previous image, the predicting unit 33 may determine a predicted object region, before or in parallel with the object detecting process by the object detecting unit 31. Since the subsequent image relative to the previous image is the current image, the predicting unit 33 may determine a predicted object region in relation to the current image. In this case, the predicting unit 33 may perform a process similar to the above-described process of determining a predicted object region on the object region in the previous image or a further previous image, thereby determining a predicted object region in the current image.

Alternatively, the predicting unit 33 may apply a tracking process based on optical flow, such as the Kanade-Lucas-Tomasi method, to the object region in the previous image and to the current image, thereby determining a predicted object region in the current image. In this case, the predicting unit 33 applies, for example, a filter for extracting characteristic points, such as a SIFT or Harris operator, to an object region in the previous image, thereby extracting multiple characteristic points from this object region. The predicting unit 33 may identify those points in the current image which correspond to the respective characteristic points in accordance with the applied tracking technique, thereby calculating the optical flow. Then, the predicting unit 33 may determine a region in the current image corresponding to the object region, based on the calculated optical flow and the object region in the previous image, and define the predicted object region as the determined region.

Every time an image is obtained from the camera 2, i.e., for each of the time series images obtained by the camera 2, the state identifying unit 34 identifies the states of tracked detection targets.

In the present embodiment, the state identifying unit 34 refers to the detected-object list to identify one or more of the tracked detection targets that each have a predicted object region in the previous image determined by the predicting unit 33. For a detection target having a predicted object region, the state identifying unit 34 inputs characteristics obtained from pixel values of the predicted object region in the current image into a second classifier, without waiting for the result of the object detecting process by the object detecting unit 31, i.e., before an object region is detected in the current image by the first classifier, thereby identifying the state of the detection target involving time-varying changes in outward appearance. For a detection target that does not have a predicted object region, the state identifying unit 34 inputs characteristics obtained from pixel values in the object region detected by the object detecting unit 31 into the second classifier, thereby identifying the state of the detection target involving time-varying changes in outward appearance. Of the state identifying process, the state identifying unit 34 performs computations of the second classifier, for example, using the third operating circuit 233 and the other processing, for example, using the first operating circuit 231 or the second operating circuit 232.

The state identifying unit 34 may use, for example, pixel values of a predicted object region or an object region as the characteristics obtained from pixel values of the predicted object region or the object region. Alternatively, the state identifying unit 34 may use values obtained by performing a predetermined filtering process, such as a convolution operation, on the pixels of a predicted object region or an object region as the characteristics obtained from pixel values of the predicted object region or the object region.

The state identifying unit 34 performs scale transformation, such as downsampling, upsampling, bi-linear interpolation, or bi-cubic interpolation, on the extracted characteristics of each predicted object region or each object region to resize them to a predetermined size (e.g., 32 by 32). This allows constant-size characteristics to be inputted into the second classifier even if the size of the tracked detection target changes in the image due to a change in the relative distance between the vehicle 10 and the detection target during tracking. Thus, the configuration of the second classifier is simplified.

As the second classifier, the state identifying unit 34 may use, for example, a neural network having a recursive structure, such as a recurrent neural network (RNN), a long short-term memory (LSTM), or a gated recurrent unit (GRU). Since the second classifier is merely required to process characteristics included in an object region or a predicted object region, the second classifier includes smaller input and intermediate layers and is defined by fewer parameters, which include weighting factors, than the first classifier. For this reason, the amount of computation of the second classifier is less than that of the first classifier, allowing for reducing the computational burden on the processor 23. Additionally, the amount of computation required to train the second classifier is also reduced. In the case that the first and second classifiers are configured as neural networks, these neural networks may be trained together by backpropagation with common training data.

The second classifier, which has a recursive structure, updates its internal state (also referred to as "intermediate state" or "hidden state"), which is recursively used therein, every time characteristics are chronologically inputted. In this way, the second classifier can identify the state of a tracked detection target of interest, based on time-varying changes in its outward appearance. This internal state is stored in the memory 22. Every time characteristics of a tracked detection target of interest are inputted, the second classifier loads the latest internal state related to the detection target from the memory 22 and applies it to the operation of the second classifier.

In the present embodiment, the state identifying unit 34 identifies the state of a detection target (i.e., another vehicle near the vehicle 10), i.e., whether its right or left turn signal or its hazard lights are blinking and whether its brake lights are on or off, as described above. To this end, for example, a sigmoid function is used as an activation function of the output layer of the second classifier. This allows the second classifier to output a confidence score of each state. The state identifying unit 34 then compares the confidence score of each state with a corresponding threshold, and determines that the detection target is in the state for which the confidence score is not less than the corresponding threshold. For example, assume that the confidence score of the state in which the left turn signal of the detection target is blinking is 0.8, and that the confidence score of the state in which it is not blinking is 0.2. Further, assume that the threshold is 0.5; then, the state identifying unit 34 determines that the detection target is in the state in which the left turn signal is blinking.

Alternatively, a softmax function may be used as an activation function of the output layer of the second classifier. In this case, the second classifier outputs, as the state of the detection target, one of the following determination results: the left turn signal is blinking; the right turn signal is blinking; the hazard lights are blinking; the brake lights are on; and none of the above. Thus, the state identifying unit 34 may identify the state of the detection target as the state indicated by the determination result outputted from the second classifier.

According to a modified example, the state identifying unit 34 may use, as the second classifier, a neural network that has a CNN architecture and performs a convolution operation in the temporal direction. In this case, the second classifier includes, for example, one or more convolution layers that perform a convolution operation on a feature map outputted from the immediately preceding layer along the temporal direction (hereafter, "temporal-feature convolution layers"). The size of a kernel of the temporal-feature convolution layers related to the temporal direction is determined, for example, so that the convolution operation may be performed all over the period including characteristics inputted all at once by going through all of the temporal-feature convolution layers. The temporal-feature convolution layers may perform a convolution operation, for example, in both the temporal direction and the spatial directions (hereafter, a "three-dimensional convolution operation"), or a convolution operation only in the temporal direction (hereafter, a "time-dimensional convolution operation"). The temporal-feature convolution layers may also perform a convolution operation or a fully-connected operation in the channel direction. In the case that the second classifier includes multiple temporal-feature convolution layers, some of the temporal-feature convolution layers may perform a three-dimensional convolution operation whereas the other temporal-feature convolution layers may perform a time-dimensional convolution operation. The second classifier may also include one or more convolution layers that perform a convolution operation in the spatial directions without performing a convolution operation in the temporal direction (hereafter, "spatial-feature convolution layers"). The spatial-feature convolution layers may also perform a convolution operation or a fully-connected operation in the channel direction. In the case that the second classifier includes one or more spatial-feature convolution layers, the spatial-feature convolution layers and the temporal-feature convolution layers may be disposed in any order. For example, the spatial-feature convolution layers and the temporal-feature convolution layers may be provided in this order from the input toward the output, or in the opposite order. The spatial-feature convolution layers may alternate with the temporal-feature convolution layers. The second classifier may also include one or more pooling layers. The second classifier may also include one or more activation layers and one or more fully-connected layers. For example, a sigmoid function or a softmax function is used as an activation function of the output layer of the second classifier.

For each detection target that is a target for state identification, the state identifying unit 34 writes the result thereof executed by the second classifier and the updated internal state to the memory 22 to update the result of state identification and the internal state stored in the memory 22, and notifies the driving planning unit 35 of the result thereof.

Figure 6:
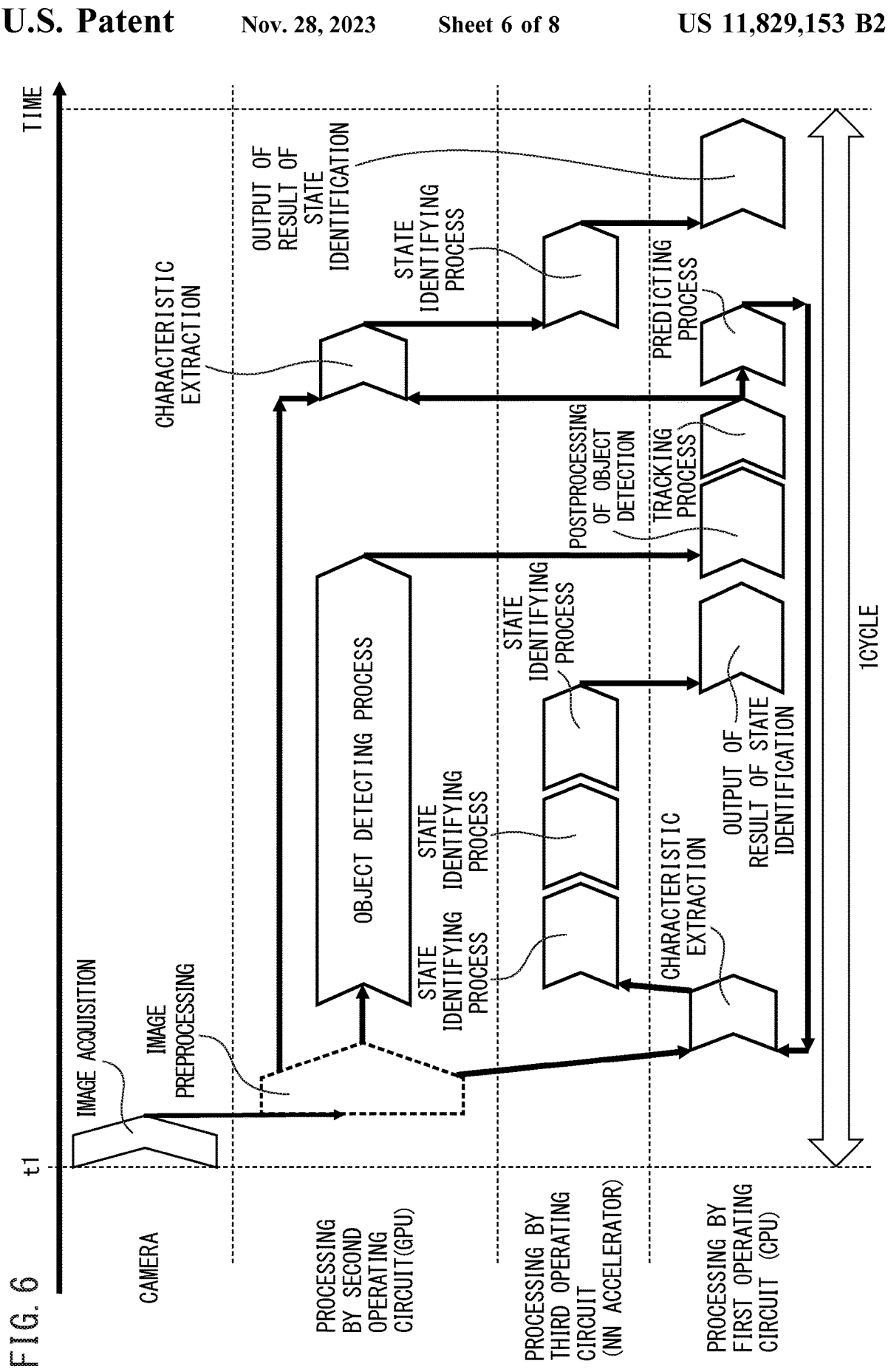
FIG. 6 is a timing chart of processes executed by the units related to a state identifying process.

FIG. 6 is a timing chart of processes executed by the units related to the state identifying process. The processes of the units of the processor 23 are managed, for example, by a scheduler (not illustrated) executed on the first operating circuit 231 of the processor 23, and are executed in accordance with the timing chart illustrated in FIG. 6. The abscissa of FIG. 6 represents time. In FIG. 6, individual blocks indicate execution of the processes represented in the respective blocks, and individual arrows indicate delivery of data (e.g., images and characteristics) between the processes. For example, the ECU 3 receives a current image from the camera 2 at time t1, and then, the first classifier of the object detecting unit 31 performs the object detecting process on the current image for detecting a detection target, in the second operating circuit 232 included in the processor 23. Before the object detecting process, preprocessing, such as contrast correction or color conversion, may be performed on the current image.

After the object detecting process, postprocessing of object detection, such as entry of the types and the object regions of detected objects into the detected-object list, is performed, and thereafter the tracking unit 32 performs the tracking process, in the first operating circuit 231 included in the processor 23. After the tracking process, a predicting process including determination whether the position in the subsequent image is predictable and determination of a predicted object region in the subsequent image is performed for each tracked detection target. As described above, the predicting process may be performed before or during the object detecting process by the first classifier. In this case, the predicting unit 33 may perform the predicting process to determine a predicted object region in the image obtained at time t1, based on the result of the object detecting process on the image obtained immediately before the image at time t1.

After the tracking process, extraction of characteristics from the object regions detected from the current image and resizing of the extracted characteristics are performed, in the second operating circuit 232, regarding detection targets for which predicted object regions based on the previous image are not determined in the current image. Then, the state identifying process is performed, using the second classifier, in the third operating circuit 233. To improve the throughput of the processor 23, it is preferable to perform the state identifying process on the detection targets in the third operating circuit 233 in a collective manner as batch processing.

Regarding detection targets for which predicted object regions based on the previous image are determined in the current image, extraction of characteristics from the predicted object regions in the current image and resizing of the extracted characteristics are executed in the first operating circuit 231, and the state identifying process is executed, using the second classifier, in the third operating circuit 233, in parallel with the object detecting process on the current image in the second operating circuit 232. The obtained results of state identification of the detection targets are used for the processes of the driving planning unit 35 and the vehicle control unit 36. To improve the throughput of the processor 23, it is preferable to execute the state identifying process on the detection targets in the third operating circuit 233 in a collective manner as batch processing.

In this way, for some of the detection targets represented in the same image, the state identifying process and the object detecting process are executed in parallel using the third operating circuit 233 and the second operating circuit 232, respectively. For the other detection targets, the state identifying process is executed using the third operating circuit 233 after the completion of the object detecting process using the second operating circuit 232. In particular, the number of such positional relationships between the vehicle 10 and a detection target as to be determined that the position in the subsequent image is unpredictable is limited. For this reason, the number of detection targets for which it is determined that the positions in the subsequent image are unpredictable, i.e., detection targets on which the state identifying process is performed after the completion of the object detecting process is assumed to be less than that of detection targets on which the state identifying process is performed during the object detecting process. For this reason, the throughput of the whole vehicle control process is improved.

Figure 7:
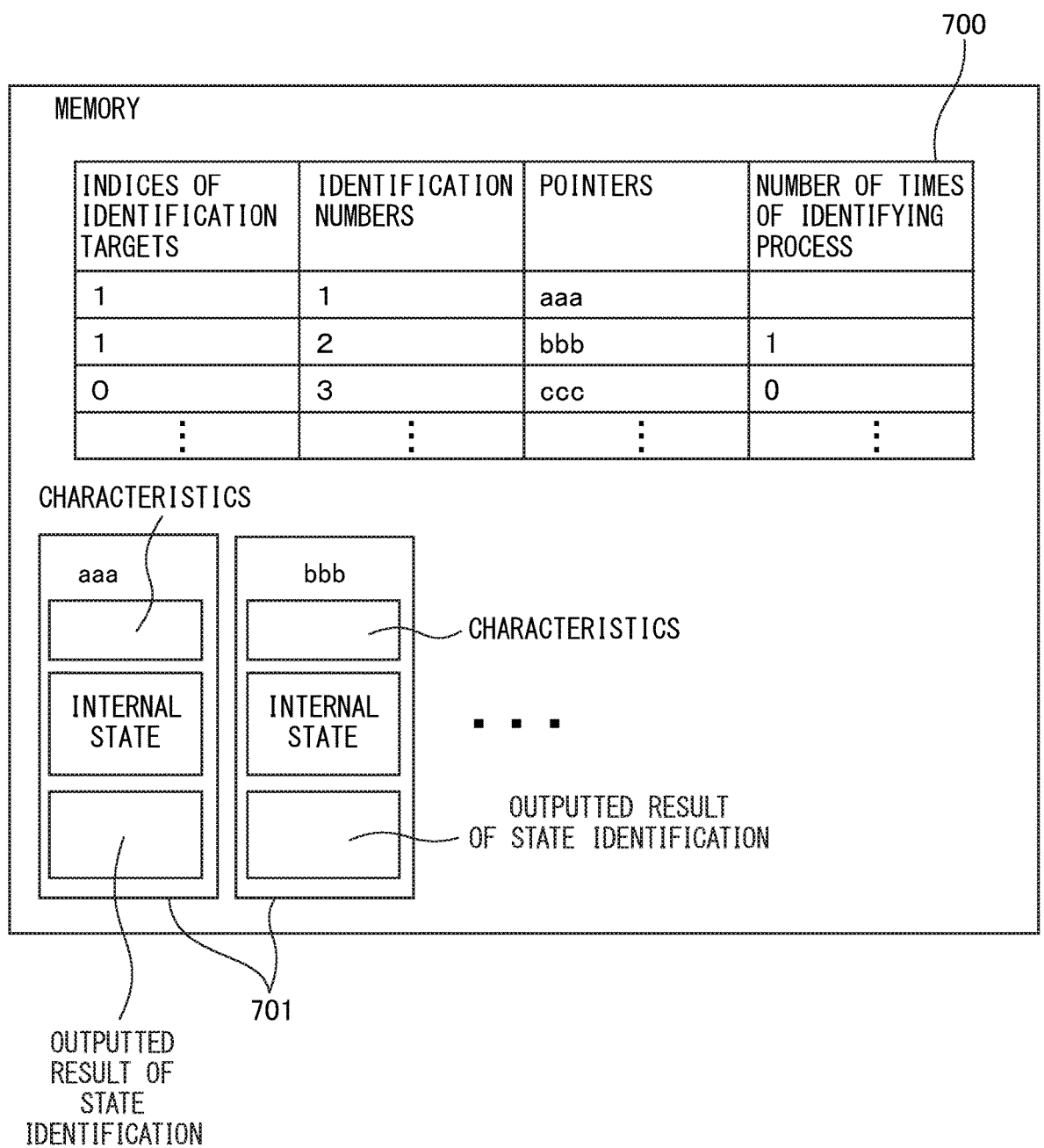
FIG. 7 illustrates an example of a detected-object list.

FIG. 7 illustrates an example of the detected-object list. For each tracked detection target, the detected-object list 700 contains an index indicating whether the detection target is a target for state identification, an identification number assigned to the detection target, a pointer indicating the address of the memory 22 where information related to the detection target is stored, and the number of times of state identification performed by the state identifying unit 34 (i.e., the number of times characteristics obtained from a corresponding object region are inputted into the second classifier). For each tracked detection target, the detected-object list 700 also contains information (not illustrated) indicating the position and area of the object region, and information (not illustrated) indicating the type of the detection target. For each tracked detection target, the detected-object list 700 also contains a flag (not illustrated) indicating whether the position in a subsequent image is predictable, and information (not illustrated) indicating the position and area of the predicted object region in the subsequent image. A storage area 701 in the memory 22 indicated by the pointer for each detection target stores the characteristics inputted into the second classifier for the latest image, the internal state of the second classifier updated last time, the result outputted from the second classifier updated last time, and other data.

The driving planning unit 35 refers to the detected-object list to generate one or more trajectories to be traveled of the vehicle 10 so that the vehicle 10 will not collide with an object near the vehicle 10. Each trajectory to be traveled is represented as, for example, a set of target locations of the vehicle 10 at points in time from the current time to a predetermined time ahead thereof. For example, the driving planning unit 35 refers to the detected-object list to perform viewpoint transformation, using information such as the position at which the camera 2 is mounted on the vehicle 10, thereby transforming the image coordinates of the objects in the detected-object list into coordinates in an aerial image ("aerial-image coordinates"). The driving planning unit 35 then performs a tracking process on sequential aerial-image coordinates, using a Kalman filter, a particle filter, or another filter, to track the objects entered in the detected-object list, and uses the trajectories obtained from the tracking results to determine predicted trajectories of the respective objects to a predetermined time ahead. The driving planning unit 35 uses the results of identification of the states of the detection targets to determine the predicted trajectories. For example, when a detection target of interest is in the state that its left turn signal is blinking, it is highly likely that this detection target will make a lane change to the left or a left turn. For this detection target, the driving planning unit 35 determines a predicted trajectory such that it will make a lane change to the left or a left turn. When a detection target of interest is in the state that its brake lights are on or that its hazard lights are blinking, it is highly likely that this detection target will slow down. For this detection target, the driving planning unit 35 determines a predicted trajectory such that it will slow down as compare to the present time. When a detection target of interest is in the state that none of the right and left turn signals and the hazard lights is blinking and that the brake lights are off, it is highly likely that this detection target will travel straight without slowing down. For this detection target, the driving planning unit 35 determines a predicted trajectory such that it will travel straight without slowing down.

The driving planning unit 35 generates a trajectory to be traveled of the vehicle 10, based on the predicted trajectories of the tracked objects and the location, speed, and orientation of the vehicle 10, so that a predicted distance between the vehicle 10 and any of the tracked objects will be not less than a predetermined distance until a predetermined time ahead. The driving planning unit 35 can estimate the location, speed, and orientation of the vehicle 10, based on, for example, current location information that is obtained from a GPS receiver (not illustrated) mounted on the vehicle 10 and indicates the current location of the vehicle 10. Alternatively, every time an image is obtained by the camera 2, a localizing processing unit (not illustrated) may detect lane division lines on the right and left of the vehicle 10 from this image, and compare the detected lane division lines with the map information stored in the memory 22, thereby estimating the location, speed and orientation of the vehicle 10. Additionally, the driving planning unit 35 may refer to, for example, the current location information of the vehicle 10 and the map information stored in the memory 22 to count the number of lanes available for travel by the vehicle 10. When more than one lane is available for travel by the vehicle 10, the driving planning unit 35 may generate a trajectory to be traveled so that the vehicle 10 will make a lane change.

The driving planning unit 35 may generate multiple trajectories to be traveled. In this case, the driving planning unit 35 may select one of the trajectories such that the sum of the absolute values of acceleration of the vehicle 10 is the smallest.

The driving planning unit 35 notifies the vehicle control unit 36 of the generated trajectory to be traveled.

The vehicle control unit 36 controls the components of the vehicle 10 so that the vehicle 10 will travel along the notified trajectory to be traveled. For example, the vehicle control unit 36 determines the acceleration of the vehicle 10 in accordance with the notified trajectory and the current speed of the vehicle 10 measured by a vehicle speed sensor (not illustrated), and determines the degree of accelerator opening or the amount of braking so that the acceleration of the vehicle 10 will be equal to the determined acceleration. The vehicle control unit 36 then determines the amount of fuel injection in accordance with the determined degree of accelerator opening, and outputs a control signal depending on the amount of fuel injection to a fuel injector of the engine of the vehicle 10. Alternatively, the vehicle control unit 36 outputs a control signal depending on the determined amount of braking to the brake of the vehicle 10.

When the vehicle 10 changes its course in order to travel along the trajectory to be traveled, the vehicle control unit 36 determines the steering angle of the vehicle 10 in accordance with the trajectory to be traveled, and outputs a control signal depending on the steering angle to an actuator (not illustrated) controlling the steering wheel of the vehicle 10.

FIG. 8 is an operation flowchart of the vehicle control process that includes the object-state identifying process and is performed by the processor 23. Every time receiving an image from the camera 2, the processor 23 performs the vehicle control process in accordance with the operation flowchart illustrated in FIG. 8. In the following operation flowchart, the process of steps S101 to S108 corresponds to the object-state identifying process.

The object detecting unit 31 of the processor 23 inputs the latest image (i.e., the current image) obtained from the camera 2 into the first classifier to detect one or more detection targets represented in the current image. More specifically, the object detecting unit 31 detects one or more object regions including detection targets in the current image (step S101). The object detecting unit 31 identifies the type of each detected detection target. The object detecting unit 31 then enters the detected detection targets in the detected-object list.

For each of the object regions including the respective detection targets in the current image, the tracking unit 32 of the processor 23 tracks the detection target represented in the object region in the current image, based on this object region and the object regions in the past images (step S102).

Regarding one or more of the tracked detection targets for which it is determined that the positions in the current image are predictable, the state identifying unit 34 of the processor 23 extracts characteristics from pixel values of predicted object regions in the current image, in parallel with execution of step S101 (step S103). The state identifying unit 34 inputs the extracted characteristics into the second classifier having a recursive structure to identify the states of these detection targets (step S104).

Regarding one or more of the tracked detection targets for which it is determined that the positions in the current image are unpredictable, the state identifying unit 34 extracts characteristics from pixel values of the object regions detected in step S101 (step S105). The state identifying unit 34 inputs the extracted characteristics into the second classifier having a recursive structure to identify the states of these detection targets (step S106).

The predicting unit 33 of the processor 23 determines whether the position in the subsequent image is predictable, for each tracked detection target (step S107). The predicting unit 33 determines predicted object regions in the subsequent image for detection targets whose positions in the subsequent image are predictable (step S108).

The driving planning unit 35 of the processor 23 refers to the detected-object list to generate a planned travel course of the vehicle 10 so that the trajectory to be traveled will be separated more than a predetermined distance from any of those predicted trajectories of the detection targets entered in the detected-object list which are determined by referring to the results of state identification (step S109). The vehicle control unit 36 of the processor 23 then controls the vehicle 10 so that the vehicle 10 will travel along the trajectory to be traveled (step S110). The processor 23 then terminates the vehicle control process.

As has been described above, every time an image is obtained by a camera mounted on a vehicle, the apparatus for identifying the state of an object inputs the image into a first classifier that has been trained to detect a detection target, thereby detecting an object region including the detection target in the image. The apparatus tracks the detected detection target to associate the object regions representing the same detection target in the images with each other. The apparatus determines whether the position of a tracked detection target is predictable in an image to be obtained next, based on, for example, the position of the object region including the detection target in the previous image, and determines a predicted object region including a predicted position of the detection target when the position of the detection target is predictable. When it is determined that the position of the detection target is predictable, the apparatus inputs, in response to obtaining the next image, characteristics obtained from pixel values of the predicted object region into a second classifier, which has a recursive structure or performs a convolution operation in the temporal direction, thereby identifying the state of the detection target. In contrast, when it is determined that the position of the detection target is unpredictable, the apparatus inputs, in response to obtaining the next image, characteristics obtained from pixel values of the object region detected from the next image by the first classifier into the second classifier, thereby identifying the state of the detection target. Thus, even when tracking multiple detection targets simultaneously, the apparatus can stagger the timings of processes performed by the second classifier for the respective detection targets. This enables the apparatus to level the load of processing in terms of time, resulting in an improvement in the throughput of the whole object-state identifying process. In particular, the apparatus performs the state identifying process, using the second classifier, on a detection target for which it is determined that the position is predictable, in parallel with the object detecting process by the first classifier, resulting in a further improvement in throughput of the whole object-state identifying process. Additionally, since it uses the first classifier, which detects an object from an individual image, to extract characteristics to be inputted into the second classifier from each of the time series images, the apparatus can reduce the total amount of computation as compared to the case in which the whole image is inputted into a classifier having a recursive structure to identify the state of the object. Additionally, images used to train the first classifier may be still images; in contrast, moving images are necessary to train the second classifier, but the size of each image included in the moving images may be smaller than that of the individual images used to train the first classifier. For this reason, the apparatus requires less cost of training the classifiers (e.g., cost incurred to collect and annotate training images), and requires a smaller amount of computation and a shorter computation time to train the classifiers.

According to a modified example, a detection target that is a target for identification of the state involving time-varying changes in outward appearance is not limited to a vehicle, and may be, for example, a person (or a child) near the vehicle 10. In this case, the state identifying unit 34 may chronologically input characteristics obtained from an object region or a predicted object region, which is detected from or determined in each of time series images including a tracked person, into the second classifier to identify his/her state (e.g., a walking state, a running state, or a running-start state in which this person is walking, running, or about to start running, respectively). In this case, the predicting unit 33 may determine that the position of a detection target assumed to be a person by the first classifier is unpredictable in the subsequent image, and omit to determine a predicted object region. Then, even when a person who is a detection target runs out into the street and thereby the positional relationship between this person and the vehicle 10 rapidly changes, the apparatus can use characteristics of a region representing this person for identifying his/her state, allowing for accurately identifying his/her state.

According to another modified example, the object detecting unit 31 may use a classifier other than a DNN, to detect a detection target from an image. For example, the object detecting unit 31 may use, as the first classifier, a support vector machine (SVM) that has been trained to output a confidence score indicating how likely a detection target is to be represented in a window defined on an image, in response to input of features (e.g., HOG) calculated with respect to the window. The object detecting unit 31 calculates the features with respect to a window defined on an image while variously changing the position, size, and aspect ratio of the window, and inputs the calculated features into the SVM to obtain the confidence score for the window. Then, the object detecting unit 31 may determine that a window for which the confidence score of a certain type of detection target is not less than a predetermined confidence-score threshold represents this detection target, and determine this window as an object region. The SVM may be prepared for each type of target object for detection. In this case, the object detecting unit 31 may input, for each window, the features calculated from the window into the SVMs to calculate the confidence scores of the respective types of objects.

A computer program for achieving the functions of the units of the processor 23 of the apparatus according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for identifying the state of an object, comprising:
a processor configured to: input, every time obtaining an image from a camera, the image into a first classifier to detect, for each of at least one predetermined object represented in the image, an object region including the object in the image;
determine, for each of the at least one predetermined object, whether the position of the object is predictable in a subsequent image to be obtained from the camera subsequent to the image;
determine, for each object whose position is predictable, a predicted object region including a predicted position of the object in the subsequent image; and
input, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image, on the other hand, input, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image;
wherein detection of the object region by the first classifier and identification of the state of each of the at least one predetermined object by the second classifier are executed using different operating circuits included in the processor; and wherein identification of the state of the at least one predetermined object that has the predicted object region in the subsequent image by the second classifier and detection of the object region from the subsequent image by the first classifier are executed in parallel;
wherein, for each of the at least one predetermined object, the processor determines whether the object is traveling on a lane adjoining a travel lane of the vehicle, determines a distance from the vehicle, and regarding the at least one predetermined object that is traveling on the adjoining lane and is a predetermined distance or less apart from the vehicle, determines that the position of the object in the subsequent image is unpredictable, and does not determine the predicted object region in the subsequent image.

2. The apparatus according to claim 1, wherein regarding the at least one predetermined object whose object region in the image has at least one edge in contact with one of the edges of the image, the processor determines that the position of the object in the subsequent image is unpredictable, and does not determine the predicted object region in the subsequent image.

3. The apparatus according to claim 1, wherein the camera is mounted on a vehicle.

4. A controller for controlling travel of a vehicle, comprising:
a processor configured to: input, every time obtaining an image from a camera mounted on the vehicle, the image into a first classifier to detect, for each of at least one predetermined object located near the vehicle and represented in the image, an object region including the object in the image;
determine, for each of the at least one predetermined object, whether the position of the object is predictable in a subsequent image to be obtained from the camera subsequent to the image;
determine, for each object whose position is predictable, a predicted object region including a predicted position of the object in the subsequent image;
input, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image, on the other hand, input, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image;
predict, for each of the at least one predetermined object, a trajectory on which the object will move, based on the state of the object;
determine a trajectory to be traveled of the vehicle, based on the predicted trajectory, so that the vehicle will be separated from any of the at least one predetermined object more than a predetermined distance; and
control the vehicle so that the vehicle will travel along the trajectory to be traveled;

wherein identification of the state of the at least one predetermined object that has the predicted object region in the subsequent image by the second classifier and detection of the object region from the subsequent image by the first classifier are executed by different operating circuits in parallel;

wherein, for each of the at least one predetermined object, the processor determines whether the object is traveling on a lane adjoining a travel lane of the vehicle, determines a distance from the vehicle, and regarding the at least one predetermined object that is traveling on the adjoining lane and is a predetermined distance or less apart from the vehicle, determines that the position of the object in the subsequent image is unpredictable, and does not determine the predicted object region in the subsequent image.

5. A method for identifying the state of an object, comprising:

inputting, every time obtaining an image from a camera, the image into a first classifier to detect, for each of at least one predetermined object represented in the image, an object region including the object in the image;

determining, for each of the at least one predetermined object, whether the position of the object is predictable in a subsequent image to be obtained from the camera subsequent to the image;

determining, for each object whose position is predictable, a predicted object region including a predicted position of the object in the subsequent image;

inputting, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image; and inputting, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image;

wherein identification of the state of the at least one predetermined object that has the predicted object region in the subsequent image by the second classifier and detection of the object region from the subsequent image by the first classifier are executed by different operating circuits in parallel;

wherein, for each of the at least one predetermined object, the processor determines whether the object is traveling on a lane adjoining a travel lane of the vehicle, determines a distance from the vehicle, and regarding the at least one predetermined object that is traveling on the adjoining lane and is a predetermined distance or less apart from the vehicle, determines that the position of the object in the subsequent image is unpredictable, and does not determine the predicted object region in the subsequent image.

6. A non-transitory recording medium having recorded thereon a computer program for identifying the state of an object, the computer program that causes a computer to execute a process comprising:

inputting, every time obtaining an image from a camera, the image into a first classifier to detect, for each of at least one predetermined object represented in the image, an object region including the object in the image;

determining, for each of the at least one predetermined object, whether the position of the object is predictable in a subsequent image to be obtained from the camera subsequent to the image;

determining, for each object whose position is predictable, a predicted object region including a predicted position of the object in the subsequent image;

inputting, regarding the at least one predetermined object having the predicted object region in the subsequent image, characteristics into a second classifier to identify the state of the object involving time-varying changes in outward appearance before the object region is detected from the subsequent image, the second classifier having a recursive structure or performing a convolution operation in a temporal direction, the characteristics being obtained from pixel values of the predicted object region in the subsequent image; and inputting, regarding the at least one predetermined object that does not have the predicted object region in the subsequent image, characteristics into the second classifier to identify the state of the object involving time-varying changes in outward appearance, the characteristics being obtained from pixel values of the object region detected from the subsequent image;

wherein identification of the state of the at least one predetermined object that has the predicted object region in the subsequent image by the second classifier and detection of the object region from the subsequent image by the first classifier are executed by different operating circuits in parallel;

wherein, for each of the at least one predetermined object, the processor determines whether the object is traveling on a lane adjoining a travel lane of the vehicle, determines a distance from the vehicle, and regarding the at least one predetermined object that is traveling on the adjoining lane and is a predetermined distance or less apart from the vehicle, determines that the position of the object in the subsequent image is unpredictable, and does not determine the predicted object region in the subsequent image.

* * * * *